(12) United States Patent
Strom et al.

(10) Patent No.: US 7,715,150 B2
(45) Date of Patent: *May 11, 2010

(54) APPARATUS AND METHOD FOR HEAD GIMBAL ASSEMBLY SHARING POWER TO SLIDER AMPLIFIER AND MICRO-ACTUATOR IN A HARD DISK DRIVE

(75) Inventors: Brian D. Strom, Cupertino, CA (US);
Na Young Kim, San Jose, CA (US);
Sung Chang Lee, San Jose, CA (US);
Vinod Sharma, Los Gatos, CA (US);
Joseph Chang, San Jose, CA (US)

(73) Assignee: Samsung Electronics Co., Ltd., Suwon, Kyungki-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/482,640

(22) Filed: Jul. 6, 2006

(65) Prior Publication Data
US 2007/0263314 A1   Nov. 15, 2007

Related U.S. Application Data

(63) Continuation-in-part of application No. 11/434,607, filed on May 15, 2006.

(51) Int. Cl.
*G11B 21/24* (2006.01)
*G11B 21/02* (2006.01)
*G11B 21/16* (2006.01)

(52) U.S. Cl. .................. 360/294; 360/244.1; 360/75

(58) Field of Classification Search .......... None
See application file for complete search history.

(56) References Cited

U.S. PATENT DOCUMENTS

| | | | | |
|---|---|---|---|---|
| 4,809,103 A | * | 2/1989 | Lazzari | 360/234.5 |
| 5,021,906 A | * | 6/1991 | Chang et al. | 360/235.1 |
| 5,121,273 A | * | 6/1992 | Slezak | 360/264.2 |
| 5,430,584 A | * | 7/1995 | Petersen | 360/78.04 |
| 5,488,518 A | * | 1/1996 | Shier | 360/67 |
| 5,726,821 A | * | 3/1998 | Cloke et al. | 360/67 |
| 5,943,189 A | * | 8/1999 | Boutaghou et al. | 360/234.7 |
| 6,025,988 A | * | 2/2000 | Yan | 361/685 |
| 6,055,132 A | * | 4/2000 | Arya et al. | 360/245.9 |
| 6,111,717 A | * | 8/2000 | Cloke et al. | 360/67 |
| 6,222,706 B1 | * | 4/2001 | Stefansky et al. | 360/294.5 |
| 6,239,947 B1 | * | 5/2001 | Fan et al. | 360/245.9 |

(Continued)

*Primary Examiner*—K. Wong
(74) *Attorney, Agent, or Firm*—Earle Jennings; GSS Law Group

(57) ABSTRACT

The head gimbal assembly includes a slider and a micro-actuator assembly sharing power for the micro-actuator assembly to aid in positioning the slider and for an amplifier included in the slider to generate an amplified read signal when the slider read accesses data on a rotating disk surface included in a hard disk drive. The slider includes a read-write head providing a read differential signal pair to an amplifier to generate an amplified read signal reported when read accessing a rotating disk surface near the slider, which includes a read head employing a spin valve or employing a tunneling valve. Hard disk drive including a head stack assembly, which includes at least one of the head gimbal assemblies. Manufacturing the head gimbal assembly, the head stack assembly, and the hard disk drive, as well as these items as products of the invention's manufacturing processes.

20 Claims, 13 Drawing Sheets

U.S. PATENT DOCUMENTS

| | | | |
|---|---|---|---|
| 6,400,529 B1 * | 6/2002 | Baba et al. | 360/234.4 |
| 6,404,575 B1 * | 6/2002 | Yen | 360/46 |
| 6,577,464 B2 * | 6/2003 | Nakagawa | 360/62 |
| 6,600,622 B1 * | 7/2003 | Smith | 360/77.06 |
| 6,638,836 B1 * | 10/2003 | Murari et al. | 438/459 |
| 6,680,810 B2 * | 1/2004 | Shiraishi et al. | 360/75 |
| 6,760,181 B2 * | 7/2004 | Li et al. | 360/75 |
| 6,822,821 B2 * | 11/2004 | Gan et al. | 360/75 |
| 6,870,717 B2 * | 3/2005 | Childress et al. | 360/324.2 |
| 6,950,266 B1 * | 9/2005 | McCaslin et al. | 360/75 |
| 6,999,285 B2 * | 2/2006 | Gill | 360/314 |
| 7,046,473 B2 * | 5/2006 | Fu et al. | 360/75 |
| 7,095,594 B2 * | 8/2006 | Maimone et al. | 360/244.1 |
| 7,310,194 B1 * | 12/2007 | Schardt et al. | 360/75 |

* cited by examiner

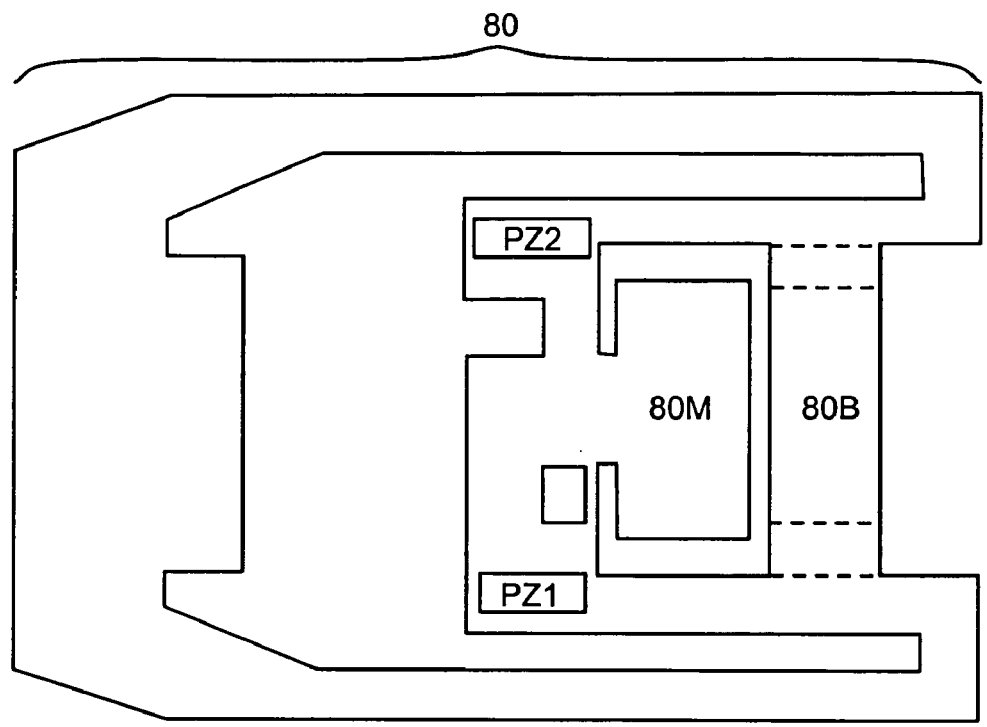
Fig. 10A
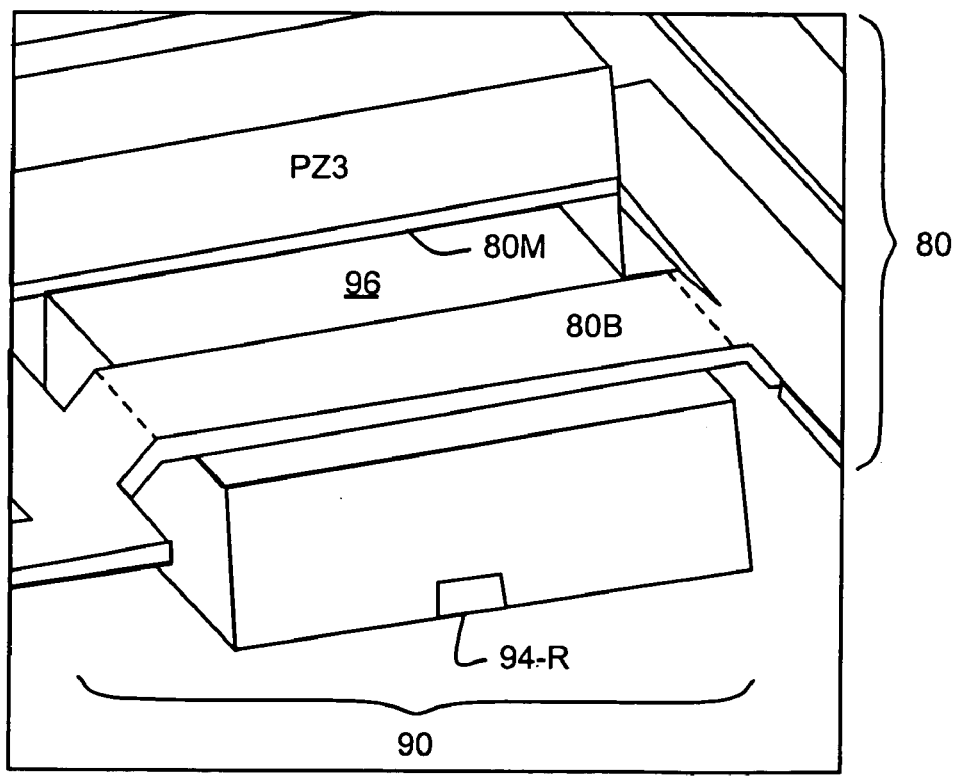

APPARATUS AND METHOD FOR HEAD GIMBAL ASSEMBLY SHARING POWER TO SLIDER AMPLIFIER AND MICRO-ACTUATOR IN A HARD DISK DRIVE

CROSS REFERENCE TO RELATED APPLICATIONS

The application is a continuation-in-part of application Ser. No. 11/434,607, filed May 15, 2006, and is hereby incorporated by reference in its entirety.

TECHNICAL FIELD

This invention relates to hard disk drives, in particular, to apparatus and methods for head gimbal assemblies supporting amplification in the slider of the read signal.

BACKGROUND OF THE INVENTION

Contemporary hard disk drives include an actuator assembly pivoting through an actuator pivot to position one or more read-write heads, embedded in sliders, each over a rotating disk surface. The data stored on the rotating disk surface is typically arranged in concentric tracks. To access the data of a track, a servo controller first positions the read-write head by electrically stimulating the voice coil motor, which couples through the voice coil and an actuator arm to move a head gimbal assembly in lateral positioning the slider close to the track. Once the read-write head is close to the track, the servo controller typically enters an operational mode known herein as track following. It is during track following mode that the read-write head is used to access data stored in the track. Micro-actuators provide a second actuation stage for lateral positioning the read-write head during track following mode. They often use an electrostatic effect and/or a piezoelectric effect to rapidly make fine position changes. They have doubled the bandwidth of servo controllers and are believed essential for high capacity hard disk drives from hereon.

A central feature of the hard disk drive industry is its quest for greater data storage density, leading to continued reduction in track width, and the size of the read head within the read-write head. As the read head shrinks, the read signal it can generate will grow weaker. While contemporary hard disk drives have a preamplifier located in the actuator assembly, this weak read signal must travel from the slider a path with significant resistance before it can be amplified. What is needed is a mechanism strengthening the read signal before it leaves the slider.

SUMMARY OF THE INVENTION

The invention's head gimbal assembly includes a slider and a micro-actuator assembly sharing power for the micro-actuator assembly to aid in positioning the slider and for an amplifier included in the slider to generate an amplified read signal when the slider read accesses data on a rotating disk surface included in a hard disk drive.

The invention uses a slider to access data on a rotating disk in a hared disk drive, that includes a read-write head providing a read differential signal pair to the amplifier to generate an amplified read signal reported when read accessing the rotating disk surface near the slider. The read-write head may include a read head employing a spin valve or employing a tunneling valve. The amplifier may be bonded to the read-write head and/or built on the read-write head.

The invention includes a hard disk drive including a head stack assembly, which includes at least one of the head gimbal assemblies.

The invention includes manufacturing the head gimbal assembly, the head stack assembly, and the hard disk drive, as well as these items as products of the invention's manufacturing processes.

BRIEF DESCRIPTION OF THE DRAWINGS

FIGS. 10A and 10B show some examples of the use of the piezoelectric effect in the micro-actuator assembly of FIG. 4B.

DETAILED DESCRIPTION

This invention relates to hard disk drives, in particular, to apparatus and methods for head gimbal assemblies supporting amplification in the slider of the read signal. The head gimbal assembly includes a slider and a micro-actuator assembly sharing power for the micro-actuator assembly to aid in positioning the slider and for an amplifier included in the slider to generate an amplified read signal when the slider read accesses data on a rotating disk surface included in a hard disk drive. The invention uses a slider including a read-write head providing a read-differential signal pair to an amplifier to generate an amplified read signal, when the slider is used to read access data on a rotating disk surface in a hard disk drive. The slider reports the amplified read signal as a result of the read access of the data.

Figure 1A:
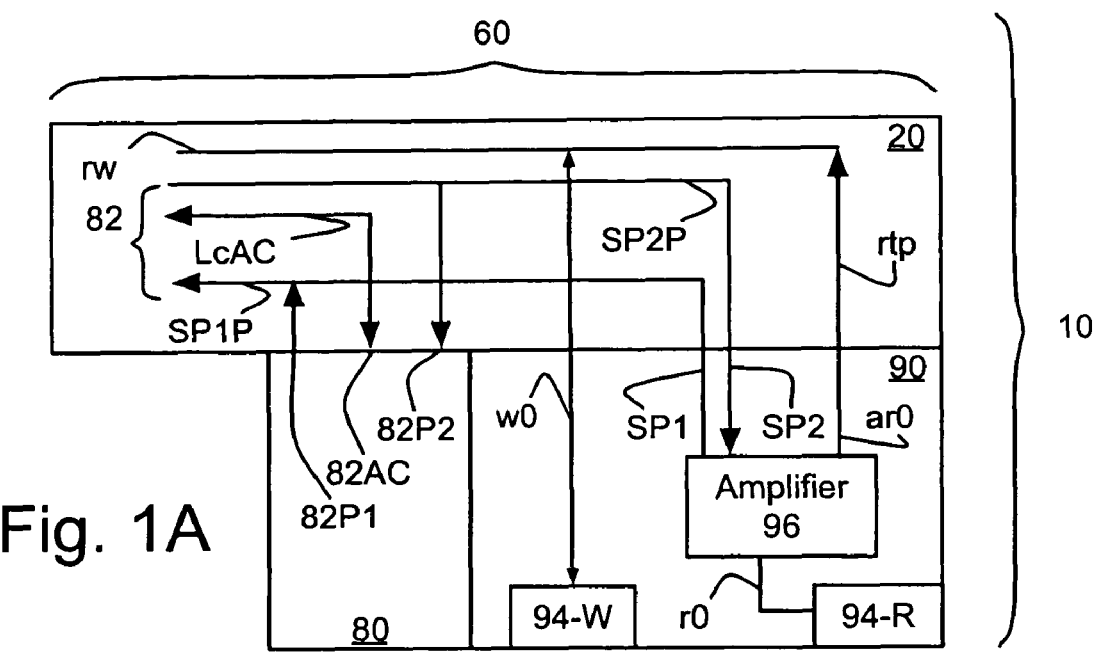
FIGS. 1A and 1B show some details of the invention's head gimbal assembly and hard disk drive.

The invention includes the head gimbal assembly 60 containing the flexure finger 20 coupled with the slider 90 and further containing the read trace path rtp electrically coupled to the amplified read signal ar0, as shown in FIG. 1A. The head gimbal assembly operates as follows when read accessing the data 122, preferably organized as the track 122, on the rotating disk surface 120-1. The slider 90 reports the amplified read signal ar0 as the result of the read access. The flexure finger provides the read trace path rtp for the amplified read signal.

The slider 90 may further include a first slider power terminal SP1 and a second slider power terminal SP2, both electrically coupled to the amplifier 96 to collectively provide power to generate the amplified read signal ar0. The flexure finger 20 may further include a first power path SP1P electrically coupled to said first slider power terminal and/or a second power path SP2P electrically coupled to the second slider power terminal SP2, which are collectively used to provide electrical power to generate the amplified read signal.

The head gimbal assembly 60 may further include a micro-actuator assembly 80 mechanically coupling to the slider 90 to aid in positioning the slider to access the data 122 on the rotating disk surface 120-1. The micro-actuator assembly may further include a first micro-actuator power terminal 82P1 and a second micro-actuator power terminal 82P2. The head gimbal assembly may further include the first micro-actuator power terminal electrically coupled to the first power path SP1P and/or the second micro-actuator power terminal electrically coupled to the second power path SP2P. Operating the head gimbal assembly may further preferably include operating the micro-actuator assembly to aid in positioning the slider to read access the data on the rotating disk surface, which includes providing electrical power shared by the micro-actuator assembly and by the amplifier 96 to collectively position the slider and support the amplifier generating the amplified read signal ar0.

Figure 4A:
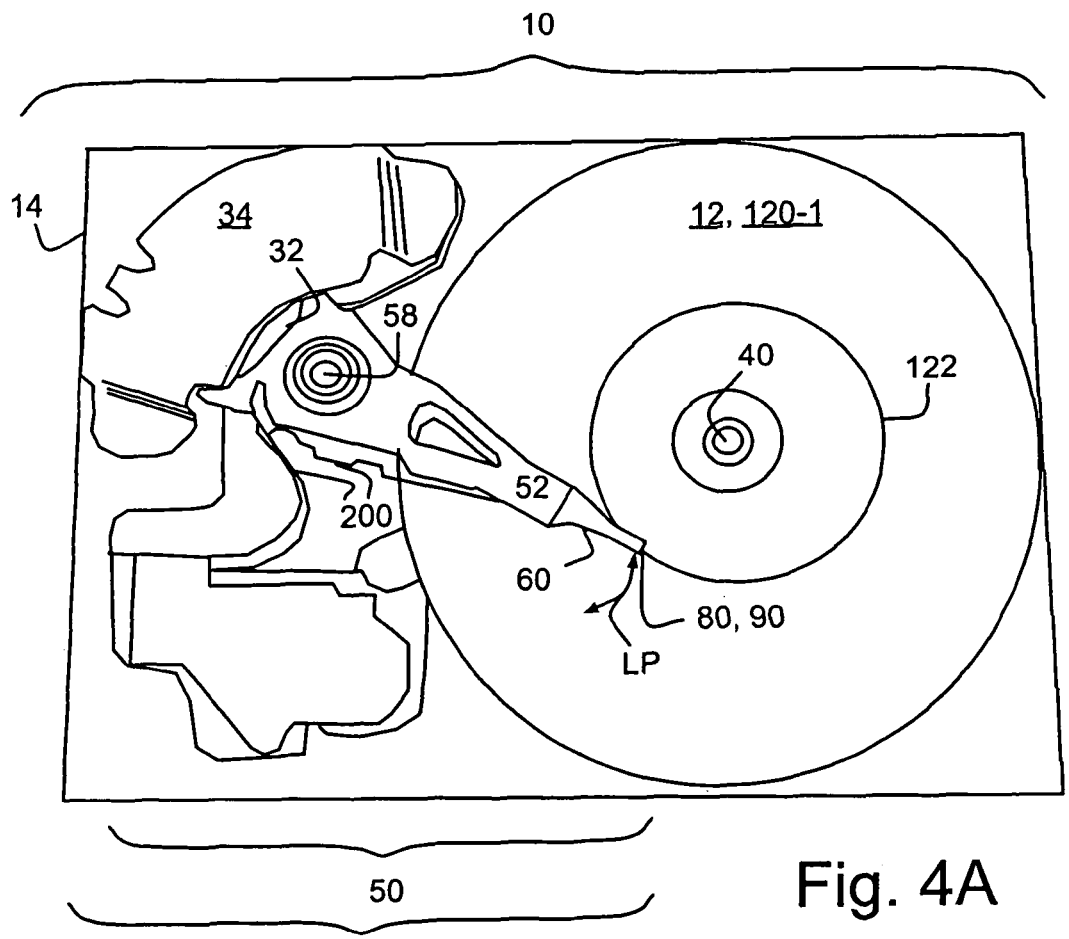
FIG. 4A shows a partially assembled hard disk drive of FIGS. 1A and 2A.
Figure 4B:
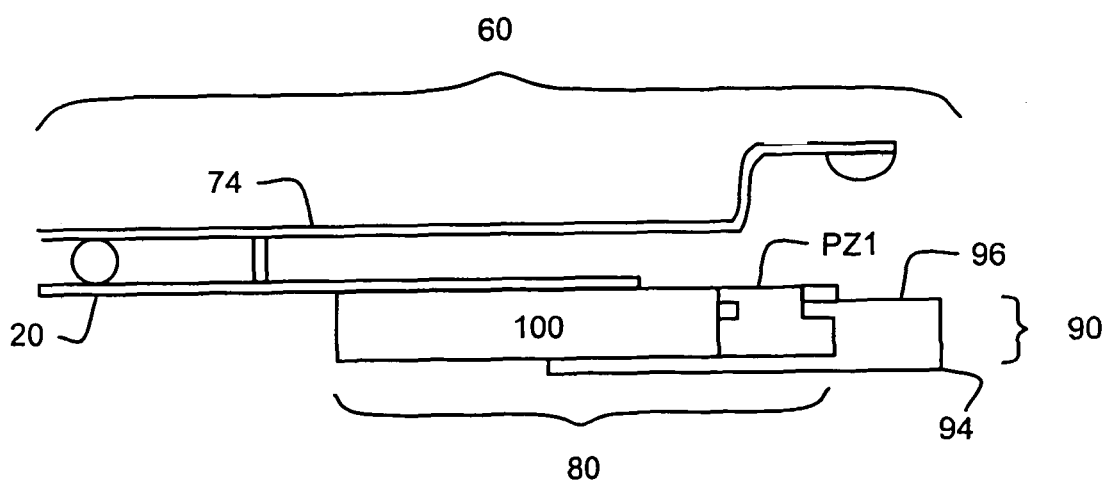
FIG. 4B shows the head gimbal assembly including the slider of FIG. 2A coupled with a micro-actuator assembly using the piezoelectric effect.
Figure 4C:
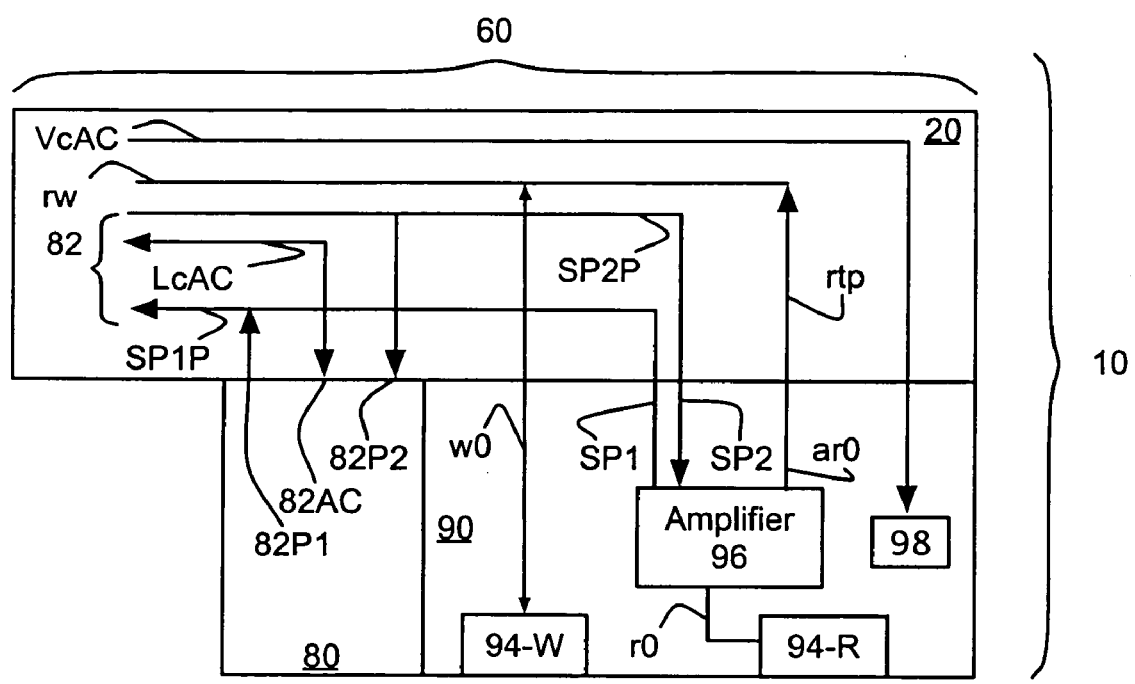
FIG. 4C shows example details of the head gimbal assembly coupled with the micro-actuator assembly and the slider including a vertical micro-actuator.
Figure 11A:
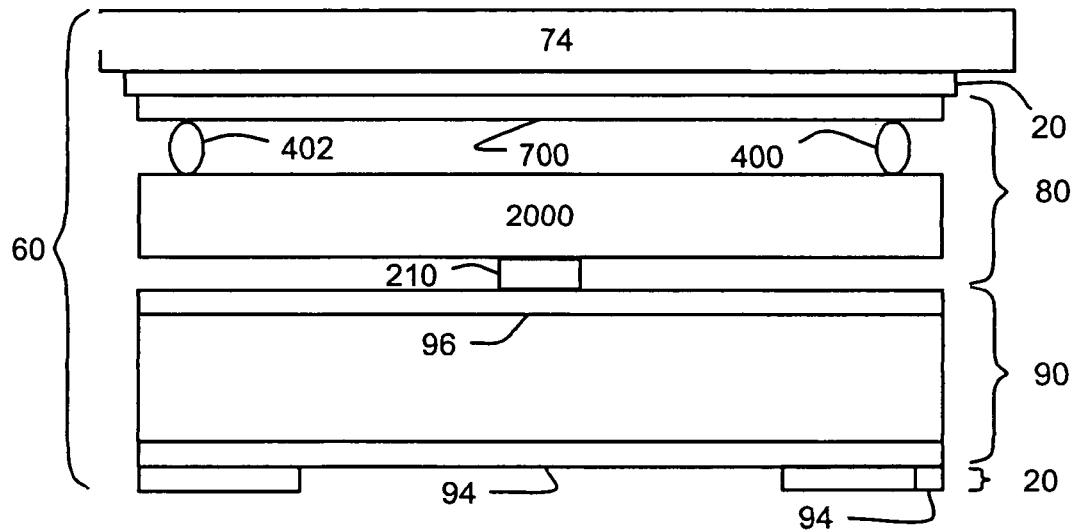
FIGS. 11A and 11B show an example of the use of the electrostatic effect in the micro-actuator assembly for the head gimbal assembly of FIG. 1A.

The flexure finger 20 may be coupled to the load beam 74 as shown in FIGS. 4B and 11A, which may further include the first power path SP1P electrically coupled to a metallic portion of the load beam. In certain embodiments, the metallic portion of the load beam may be essentially all of the load beam.

In further detail, the head gimbal assembly 60 includes a base plate 72 coupled through a hinge 70 to a load beam 74. Often the flexure finger 20 is coupled to the load beam and the micro-actuator assembly 80 and slider 90 are coupled through the flexure finger to the head gimbal assembly.

Manufacturing the invention's head gimbal assembly 60 includes coupling the flexure finger 20 to the invention's slider 90, which further includes electrically coupling the read trace path rtp with the amplified read signal ar0. The invention includes the manufacturing process and the head gimbal assembly as a product of the process. Manufacturing the head gimbal assembly may further include coupling the micro-actuator assembly 80 to the slider. Coupling the micro-actuator assembly to the slider may include electrically coupling the first micro-actuator power terminal 82P1 to the first slider power terminal SP1P and/or electrically coupling the second micro-actuator power terminal 82P2 to the second slider power terminal SP2P.

Figure 2A:
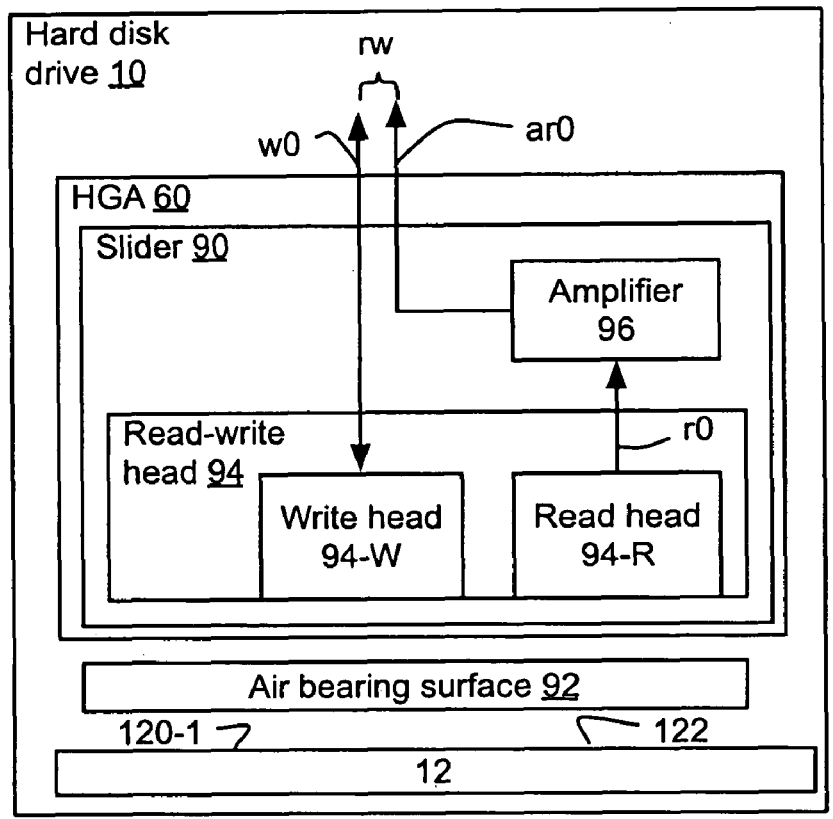
FIG. 2A shows a simplified schematics of the slider used in FIG. 1A.

In greater detail, the slider 90 includes the read-write head 94 that includes the read-write head 94 providing the read-differential signal pair r0 to the amplifier 96 to generate the amplified read signal ar0, as shown in FIG. 2A. The read-write head preferably includes a read head 94-R driving the read differential signal pair r0 and a write head 94-W receiving a write differential signal pair w01. The slider is used to access the data 122 on the rotating disk surface 120-1 in a hard disk drive 10, as shown in FIG. 4A. The data is typically organized in units known as a track 122, which are usually arranged in concentric circles on the rotating disk surface centered about a spindle shaft 40. Operating the slider to read access the data on the rotating disk surface includes the read head driving the read differential signal pair to read access the data on the rotating disk surface, and the amplifier receiving the read differential signal pair to create the amplifier read signal. The slider reports the amplified read signal as a result of read access of the data on the rotating disk surface.

Figure 2B:
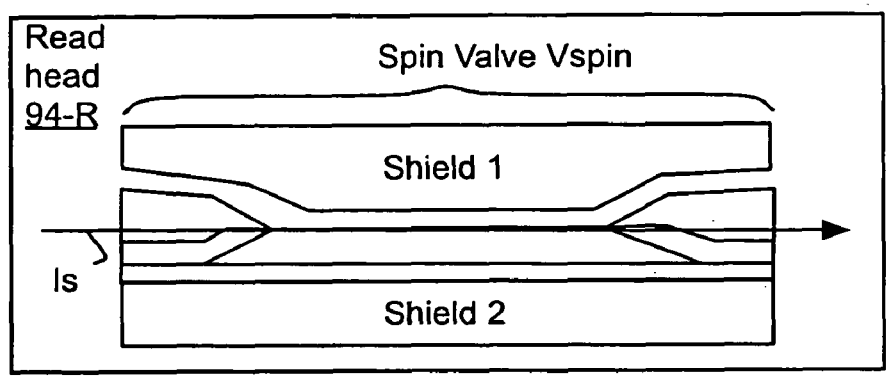
FIG. 2B shows an example of the read head of FIG. 2A employing a spin valve.
Figure 8A:
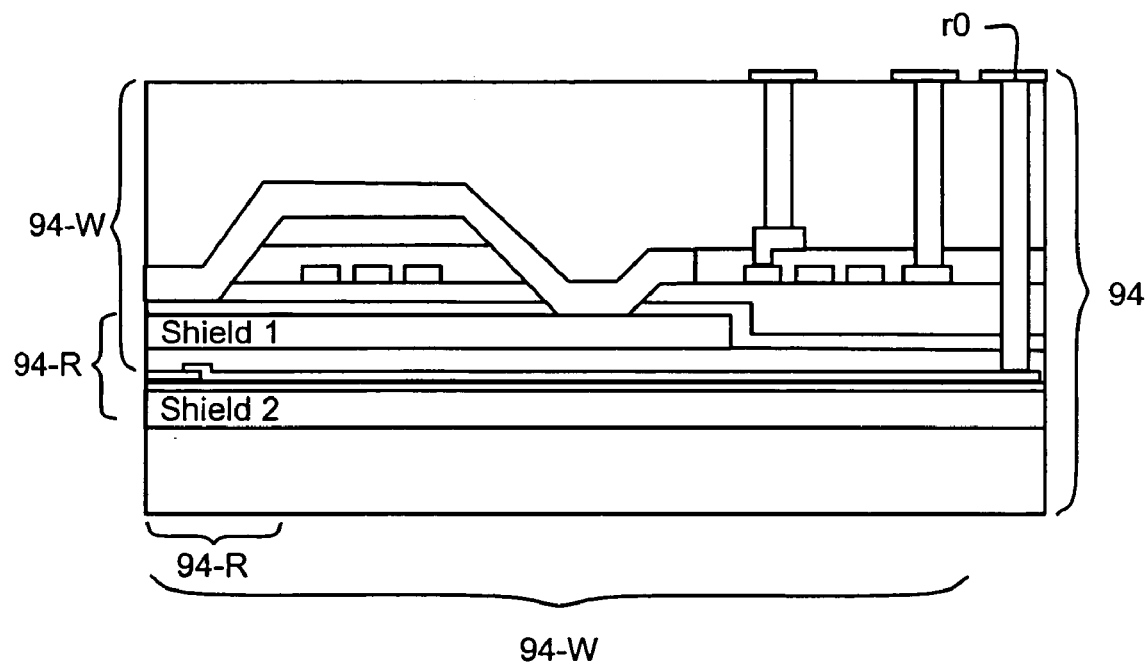
FIG. 8A shows some details of the read-write head using the spin valve of FIG. 2B.
Figure 8B:
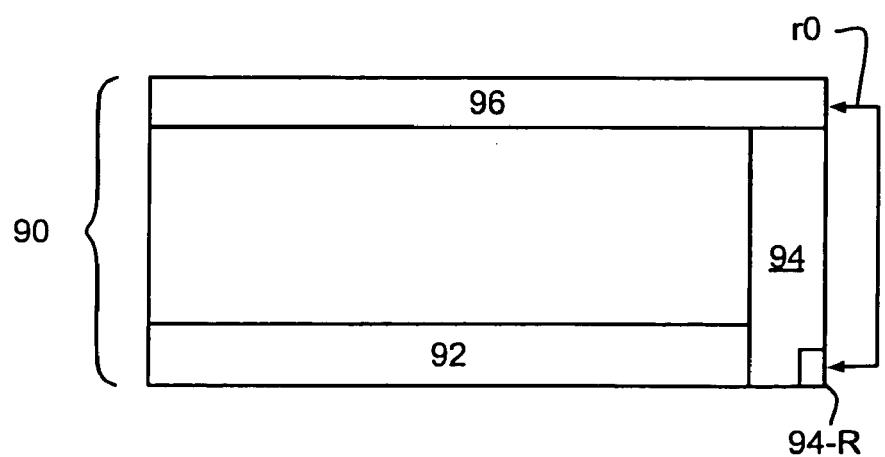
FIGS. 8B to 8E show some details of the invention's slider employing the spin valve of FIGS. 1B and 8A or the tunneling valve of FIGS. 1C, 9A, and 9B.

The read head 94-R of FIG. 2A may use a spin valve to drive the read differential signal pair as shown in FIG. 2B. As used herein, the spin valve employs a magneto-resistive effect to create an induced sensing current Is between the first shield Shield1 and the second shield Shield2. Spin valves have been in use the since the mid 1990's. An idealized and simplified cross section of a read-write head using a spin vale is shown in FIG. 8A. FIG. 8B shows a simplified cross section of the invention's slider 90. The read-write head 94 traverses perpendicular to the air bearing surface 92 to the amplifier 96, due to the sensing current flowing between the shields.

Figure 2C:
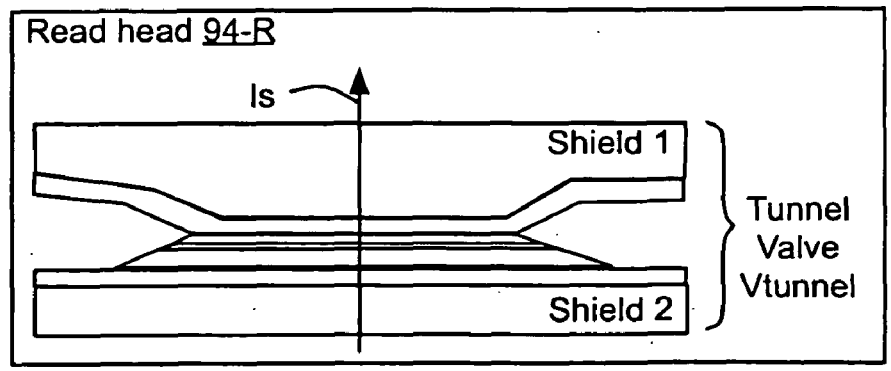
FIG. 2C shows an example of the read head of FIG. 2A employing a tunnel valve.

Alternatively, the read head 94-R may use a tunnel valve to drive the read differential signal pair as shown in FIG. 2C. As used herein, a tunnel valve uses a tunneling effect to modulate the sensing current Is perpendicular to the first shield Shield1 and the second shield Shield2.

Figure 3A:
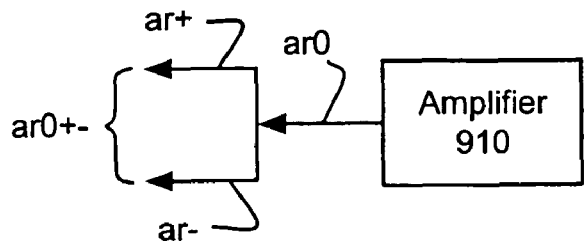
FIGS. 3A and 3B show examples of details of FIG. 2A.
Figure 3B:
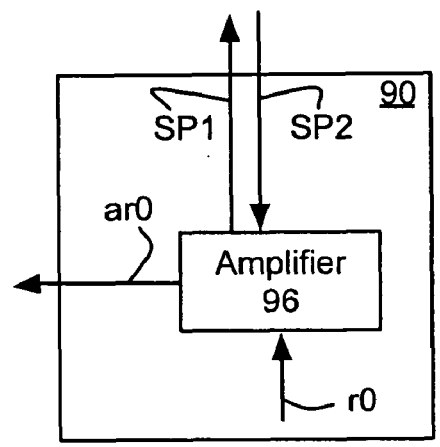
Figure 3C:
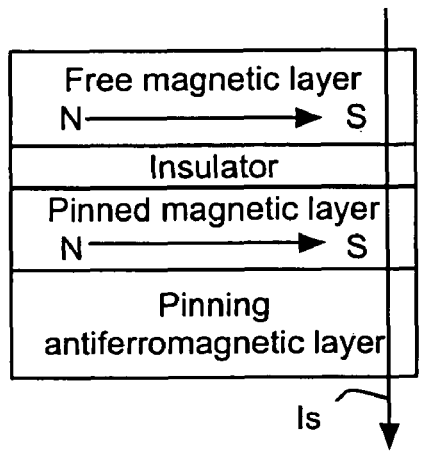
FIGS. 3C and 3D show some details of the operation of the tunnel valve of FIG. 2C.
Figure 3D:
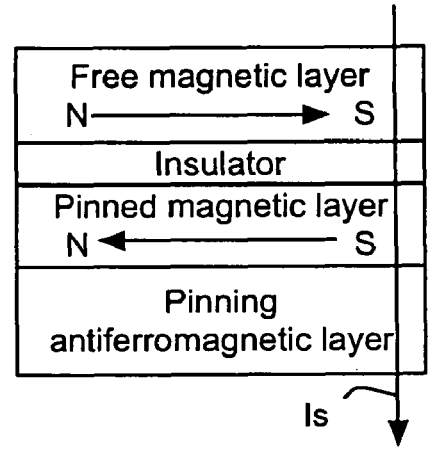
Figure 3E:
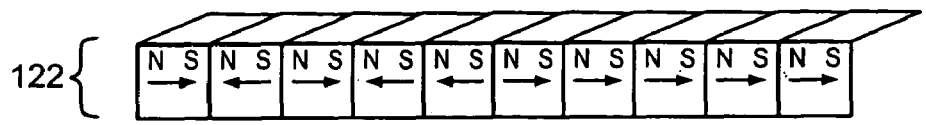
FIG. 3E shows a typical polarization of bits in the track on the rotating disk surface used with the spin valve of FIG. 2B.
Figure 3F:
FIG. 3F shows a typical polarization of bits in the track on the rotating disk surface used with the spin valve of FIG. 2C.

Both longitudinally recorded signal as shown in FIG. 3E and perpendicularly recorded signals as shown in FIG. 3F may be read by read-heads using either a spin valve or a tunneling valve. Perpendicular versus longitudinal recording is related to the combination of write head and disk media making up the rotating disk surface. This difference in bit polarization lead to the announcement of a large increase in data density, a jump of almost two hundred percent in the spring of 2005.

To further discuss the tunnel valve and its use in embodiments of the invention, consider FIGS. 3C and 3D. The pinned magnetic layer is separated from the free ferromagnetic layer by an insulator, and is coupled to the pinning antiferromagnetic layer. The magneto-resistance of the tunnel valve is caused by a change in the tunneling probability, which depends upon the relative magnetic orientation of the two ferromagnetic layers. The sensing current Is, is the result of this tunneling probability. The response of the free ferromagnetic layer to the magnetic field of the bit of the track 122 of the rotating disk surface 120-1, results in a change of electrical resistance through the tunnel valve. FIG. 3C shows the response with low resistance and FIG. 3D shows the high resistance response.

However, in most but not all of the invention's sliders, the amplifier 96 is preferably opposite the air bearing surface.

The amplified read signal ar0 may be implemented as an amplified read signal pair ar0+—as shown in FIG. 3A, or as a single ended read signal, as shown elsewhere throughout the Figures. While the decision has been made to show the amplified read signal as a single ended read signal, this has been done to simplify the discussion, and is not intended to limit the scope of the invention.

The invention's slider 90 may further include a first slider power terminal SP1 and a second slider power terminal SP2 collectively used to power the amplifier 96 in generating the amplified read signal ar0, as shown in FIG. 3B.

Figure 8C:
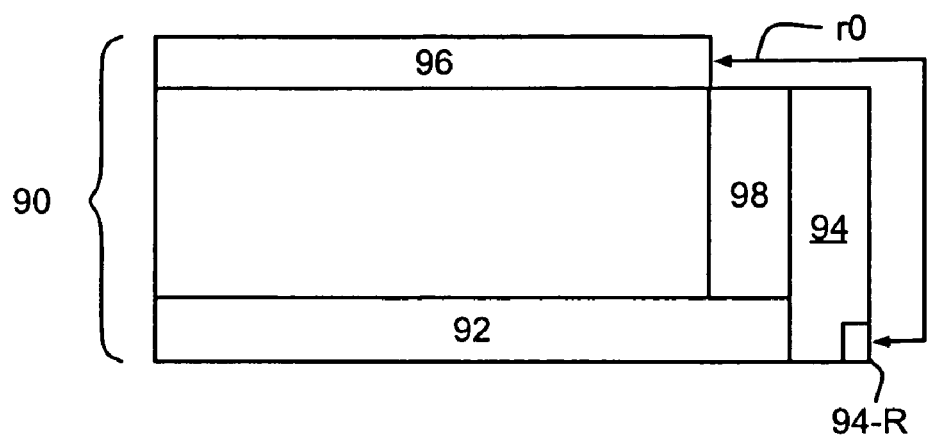
Figure 8D:
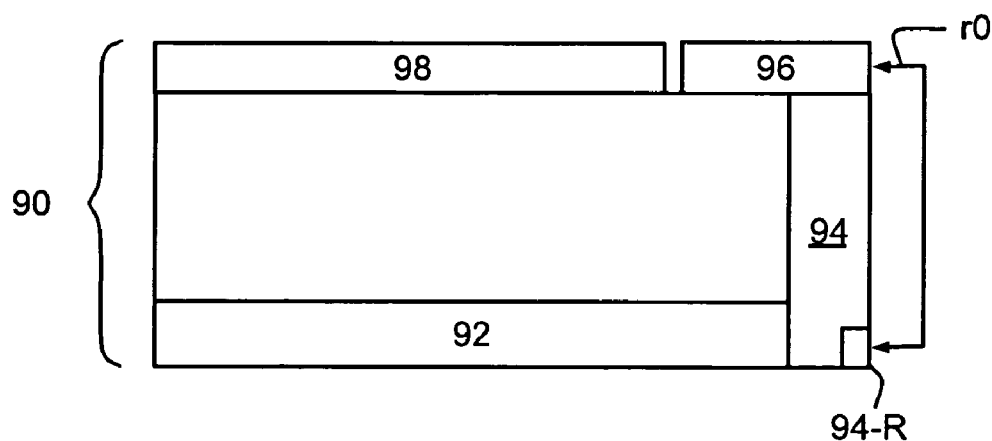
Figure 8E:
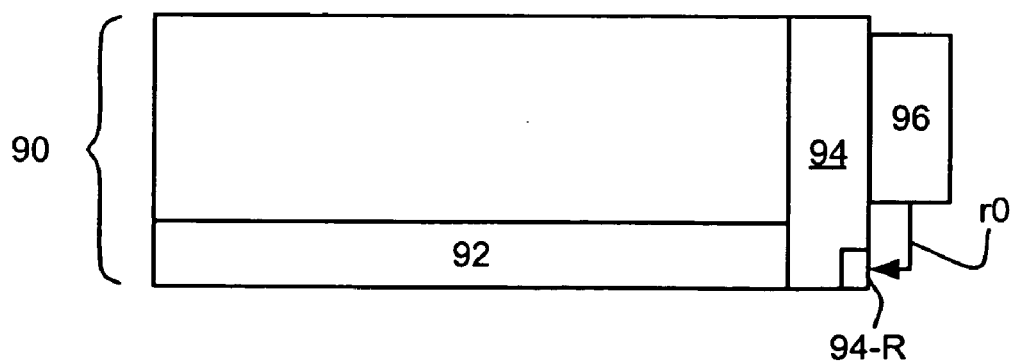
Figure 9A:
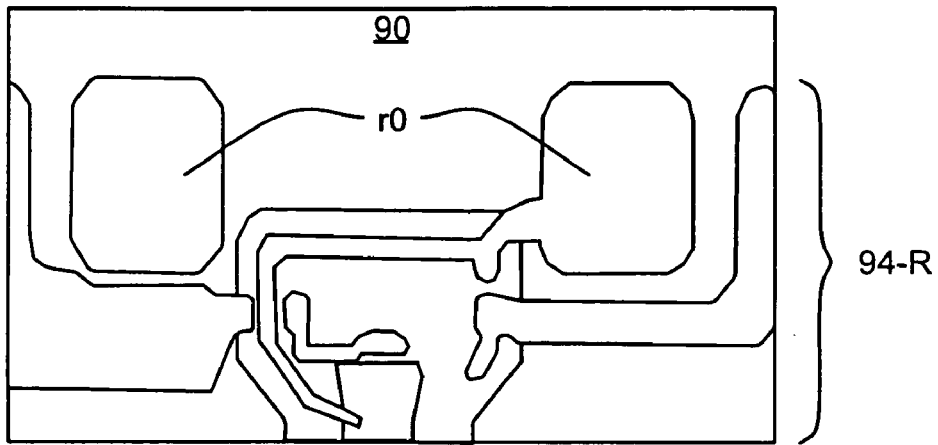
FIGS. 9A and 9B show some details of the read-write head employing the tunnel valve.
Figure 9B:
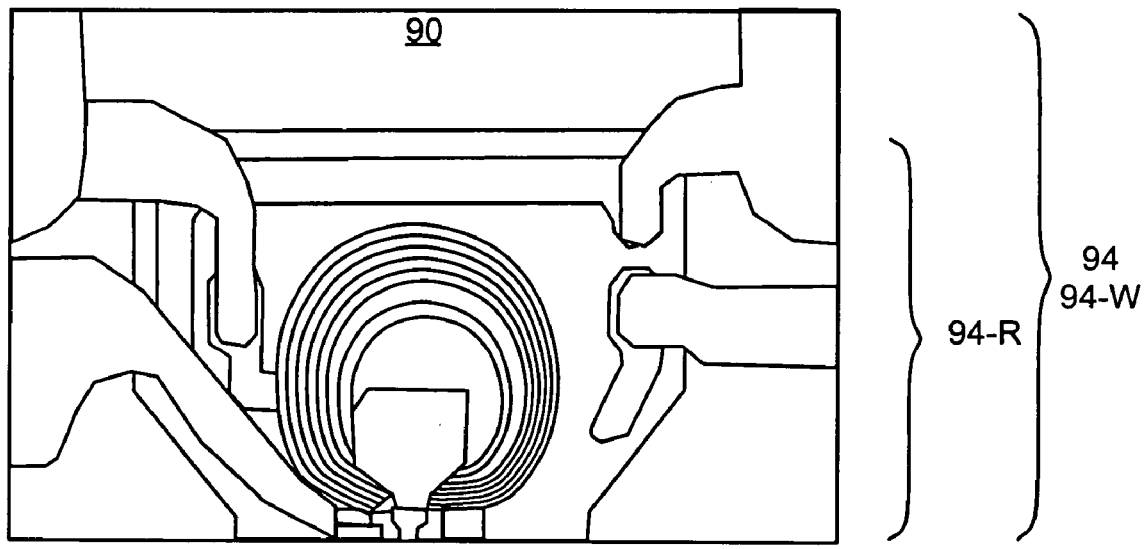
Figure 9C:
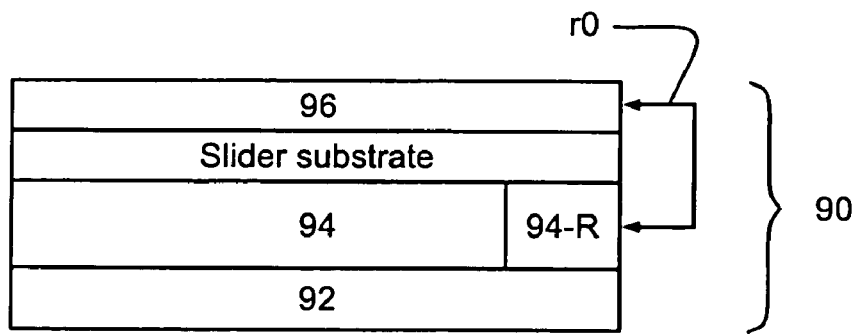
FIG. 9C shows some details of the invention's slider employing the tunnel valve.

The slider 90 may also include a vertical micro-actuator 98 for urging the outermost portions of the read-write head 94 closer or farther away from the rotating disk surface 120 as shown in FIGS. 4B, 4C, 8C and 8D. The vertical microactuator may be a thermal actuator controlled by two electrical terminals, one of which may preferably be shared with SP1 The other terminal may preferably be connected to the vertical control signal VcAC, which may prefer an embodiment as shown in FIG. 8C. Other forms of the vertical micro-actuator mounted to the slider may be preferable, for example a piezoelectric actuator as shown in FIG. 8D. When a vertical micro-actuator is included in the slider, it tends to induce a strain on the materials directly coupled to it, making it preferable for the amplifier 96 to not be directly coupled to the vertical micro-actuator. Today's read-write head has five wires: two providing a differential read signal pair r0, two providing a write differential signal pair w0, and one signal providing the vertical control signal VcAC. The vertical micro-actuator may preferably be grounded to the load beam 74 through a via in the flexure finger 20 coupled to the load beam.

Manufacturing the slider 90 includes coupling the read-write head 94 to the amplifier 96, which further includes electrically coupling the read differential signal pair to the amplifier. The invention includes the manufacturing process of the slider and the slider as a product of that manufacturing process. The manufacturing further includes providing an air bearing surface 92 near the read head 94-R.

Coupling the read-write head 94 to the amplifier 96 may further include bonding the amplifier to the read head 94-R and/or building the amplifier to the read head. Bonding the amplifier may include gluing, and/or welding, and/or soldering the amplifier to the read head. Building the amplifier may include depositing an insulator to create a signal conditioning base, and/or using a slider substrate as a signal conditioning base, and/or depositing a first semiconductor layer on the signal conditioning base. The building may further include define at least one pattern, at least one etch of the pattern to create at least one layer, for at least one semiconducting material and at least one layer of metal to form at least one transistor circuit embodying the amplifier. The transistors preferably in use at the time of the invention include, but are not limited to, bipolar transistors, Field Effect Transistors (FETs), and amorphous transistors.

Figure 1B:
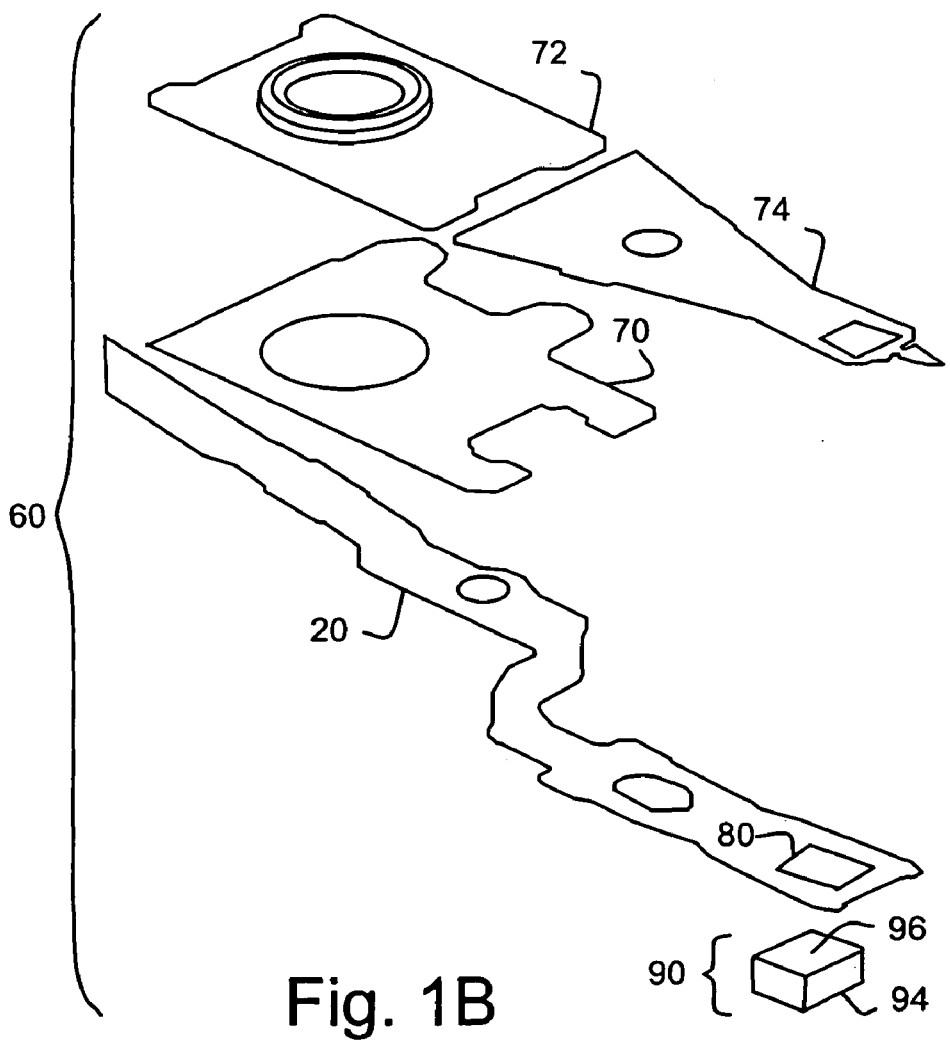

The micro-actuator assembly 80 may employ a piezoelectric effect and/or an electrostatic effect to aid in positioning the slider 90. First, examples of micro-actuator assemblies employing the piezoelectric effect will be discussed followed by electrostatic effect examples. In several embodiments of the invention the micro-actuator assembly may preferably couple with the head gimbal assembly 60 through the flexure finger 20, as shown in FIGS. 4B and 1B. The micro-actuator assembly may further couple through the flexure finger to a load beam 74 to the head gimbal assembly and consequently to the head stack assembly 50.

Examples of micro-actuator assemblies employing the piezoelectric effect are shown in FIGS. 4B, 10A and 10B. FIG. 4B shows a side view of a head gimbal assembly with a micro-actuator assembly 80 including at least one piezoelectric element PZ1 for aiding in laterally positioning LP of the slider 90. In certain embodiments, the micro-actuator assembly may consist of one piezoelectric element. FIG. 10A shows a micro-actuator assembly including the first piezoelectric element and a second piezoelectric element PZ2, which may preferably both aid in laterally positioning the slider. FIG. 10B shows a front perspective view of the micro-actuator assembly coupled with the slider with a third piezoelectric element PZ3 to aid in the vertically positioning the slider to the rotating disk surface 120-1.

Figure 11B:
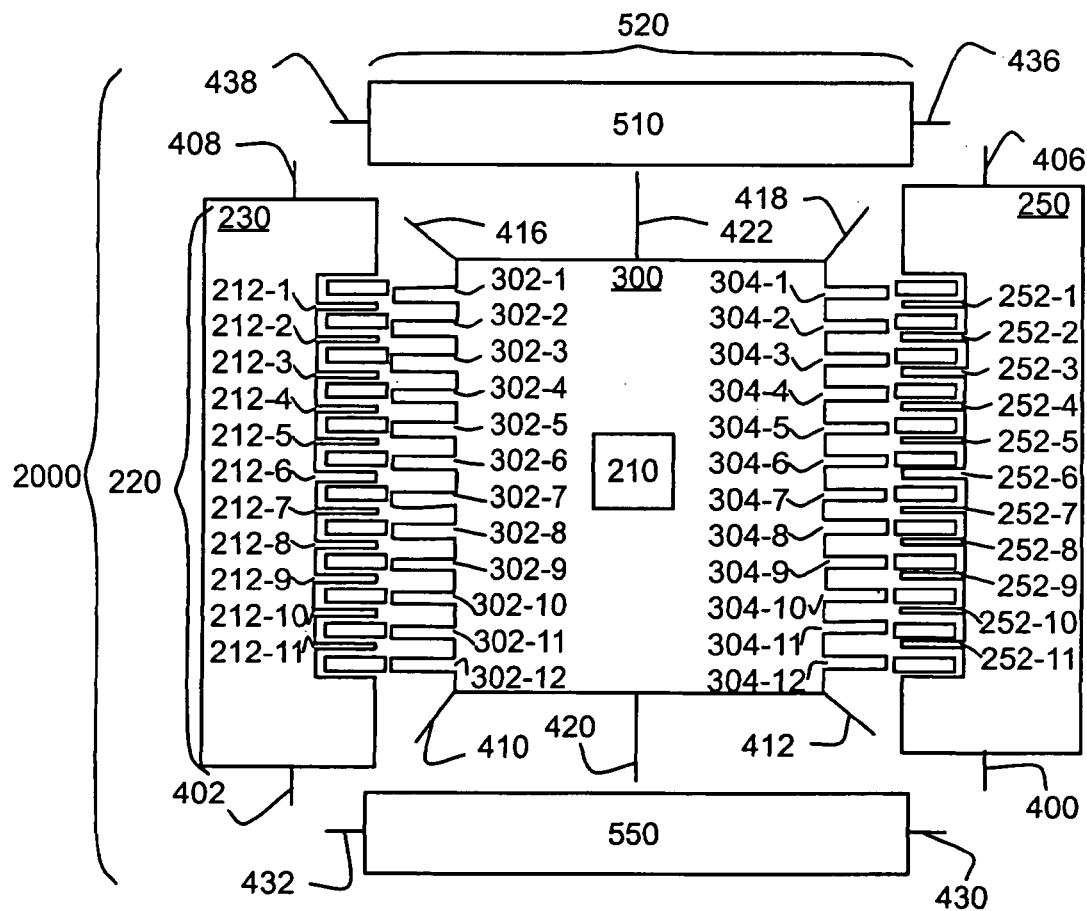

Examples of the invention using micro-actuator assemblies employing the electrostatic effect are shown in FIGS. 11A and 11B derived from the Figures of U.S. patent application Ser. No. 10/986,345, which is incorporated herein by reference. FIG. 11A shows a schematic side view of the micro-actuator assembly 80 coupling to the flexure finger 20 via a micro-actuator mounting plate 700. FIG. 1B shows the micro-actuator assembly using an electrostatic micro-actuator assembly 2000 including a first electrostatic micro-actuator 220 to aid the laterally positioning LP of the slider 90. The electrostatic micro-actuator assembly may further include a second electrostatic micro-actuator 520 to aid in the vertically positioning VP of the slider.

The first micro-actuator 220 includes the following. A first pivot spring pair 402 and 408 coupling to a first stator 230. A second pivot spring pair 400 and 406 coupling to a second stator 250. A first flexure spring pair 410 and 416, and a second flexure spring pair 412 and 418, coupling to a central movable section 300. A pitch spring pair 420-422 coupling to the central movable section 300. The central movable section 300 includes signal pair paths coupling to the amplified read signal ar0 and the write differential signal pair W0 of the read-write head 94 of the slider 90.

The bonding block 210 preferably electrically couples the read-write head 90 to the amplified read signal ar0 and write differential signal pair W0, and mechanically couples the central movable section 300 to the slider 90 with read-write head 94 embedded on or near the air bearing surface 92 included in the slider.

The first micro-actuator 220 aids in laterally positioning LP the slider 90, which can be finely controlled to position the read-write head 94 over a small number of tracks 122 on the rotating disk surface 120-1. This lateral motion is a first mechanical degree of freedom, which results from the first stator 230 and the second stator 250 electrostatically interacting with the central movable section 300. The first micro-actuator 220 may act as a lateral comb drive or a transverse comb drive, as is discussed in detail in the incorporated United States Patent Application.

The electrostatic micro-actuator assembly 2000 may further include a second micro-actuator 520 including a third stator 510 and a fourth stator 550. Both the third and the fourth stator electrostatically interact with the central movable section 300. These interactions urge the slider 90 to move in a second mechanical degree of freedom, aiding in the vertically positioning VP to provide flying height control. The second micro-actuator may act as a vertical comb drive or a torsional drive, as is discussed in detail in the incorporated United States Patent Application. The second micro-actuator may also provide motion sensing, which may indicate collision with the rotating disk surface 120-1 being accessed.

The central movable section 300 not only positions the read-write head 10, but is the conduit for the amplified read signal ar0, the write differential signal pair W0 and in certain embodiments, the first slider power signal SP1 and the second slider power signal SP2. The electrical stimulus of the first micro-actuator 220 is provided through some of its springs.

The central movable section 300 may preferably to be at ground potential, and so does not need wires. The read differential signal pair r0, write differential signal pair w0 and slider power signals SP1 and SP2 traces may preferably be routed with flexible traces all the way to the load beam 74 as shown in FIG. 11A.

The invention includes a flexure finger 20 for the slider 90, providing a read trace path rtp for the amplified read signal ar0, as shown in FIG. 1A. The lateral control signal 82 preferably includes the first lateral control signal 82P1 and the second lateral control signal 82P2, as well as the AC lateral control signal 82AC. The flexure finger may further include a micro-actuator assembly 80 for mechanically coupling with the slider to aid in positioning the slider to access the data 122 on the rotating disk surface 120-1. The micro-actuator assembly may aid in laterally positioning LP the slider to the rotating disk surface 120-1 as shown in FIG. 4A and/or aid in vertically positioning VP the slider as shown in FIG. 5.

Figure 5:
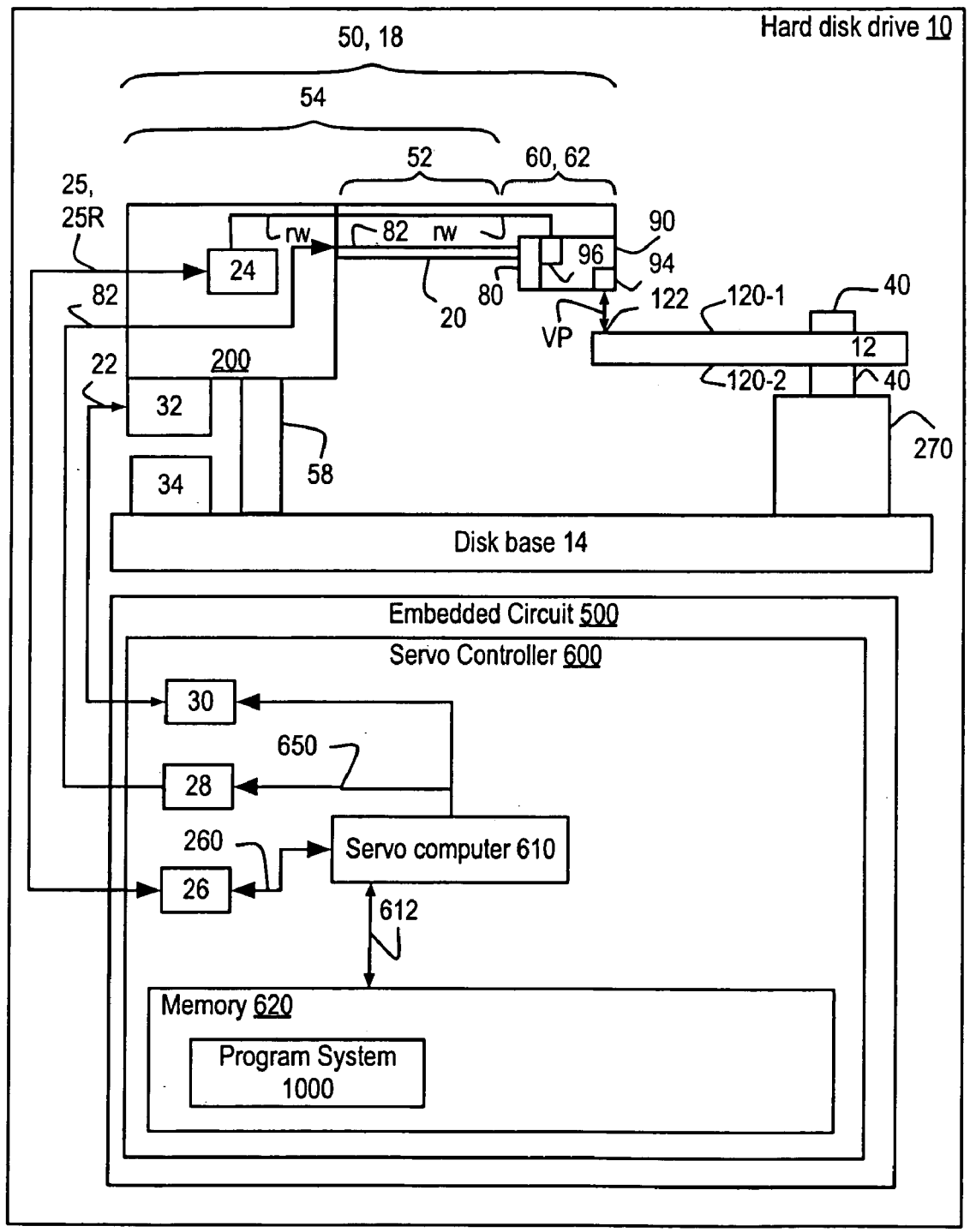
FIGS. 5 to 7 show some details of the hard disk drive of FIGS. 1A, 2A and 4A.
Figure 6:
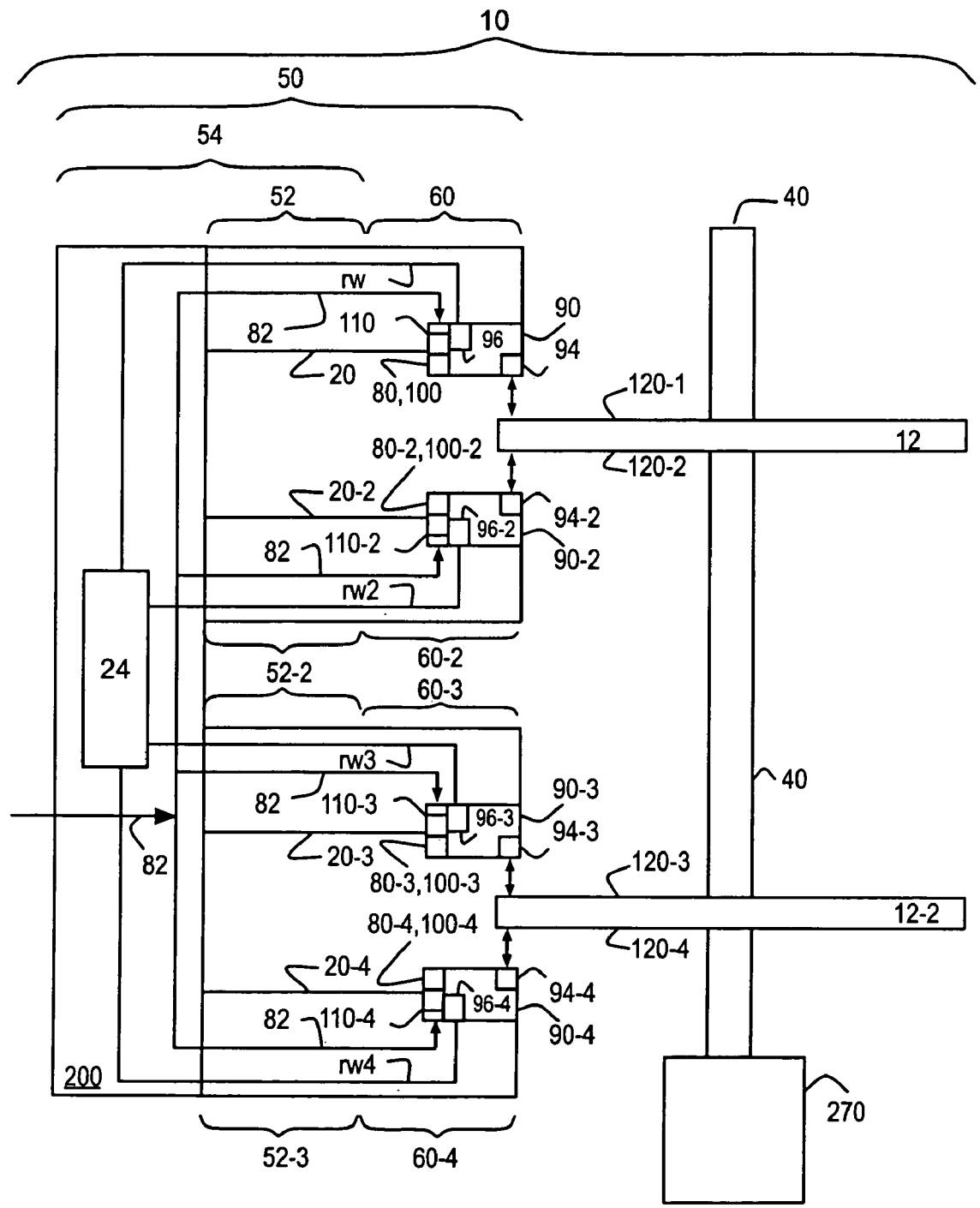
Figure 7:
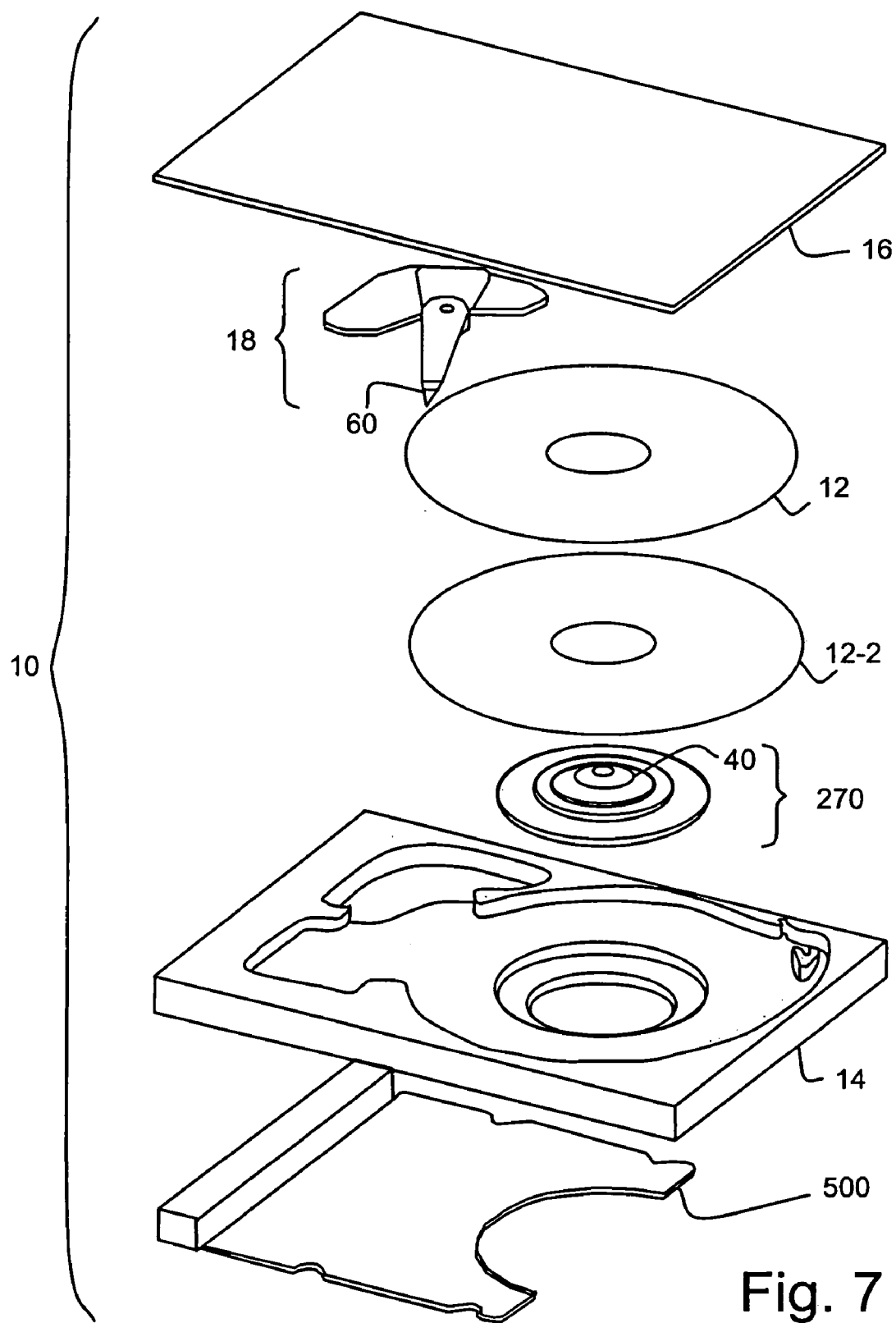

The invention also includes a head stack assembly 50 containing at least one head gimbal assembly 60 coupled to a head stack 54, as shown in FIGS. 5 and 6. The head stack assembly operates as follows when read accessing the data 122, preferably organized as the track 122, on the rotating disk surface 120-1. The slider 90 reports the amplified read signal ar0 as the result of the read access. The flexure finger provides the read trace path rtp for the amplified read signal, as shown in FIG. 1A. The main flex circuit 200 receives the amplified read signal from the read trace path to create the read signal 25-R.

The head stack assembly may include more than one head gimbal assembly coupled to the head stack. By way of example, FIG. 6 shows the head stack assembly coupled with a second head gimbal assembly 60-2, a third head gimbal assembly 60-3 and a fourth head gimbal assembly 60-4. Further, the head stack is shown in FIG. 5 including the actuator arm 52 coupling to the head gimbal assembly. In FIG. 6, the head stack further includes a second actuator arm 52-2 and a third actuator arm 52-3, with the second actuator arm coupled to the second head gimbal assembly 60-2 and a third head gimbal assembly 60-3, and the third actuator arm coupled to the fourth head gimbal assembly 60-4. The second head gimbal assembly includes the second slider 90-2, which contains the second read-write head 94-2. The third head gimbal assembly includes the third slider 90-3, which contains the third read-write head 94-3. And the fourth head gimbal assembly includes a fourth slider 90-4, which contains the fourth read-write head 94-4.

The head stack assembly 50 may include a main flex circuit 200 coupled with the flexure finger 20, which may further include a preamplifier 24 electrically coupled to the read trace path rtp in the read-write signal bundle rw to create the read signal 25-R based upon the amplified read signal ar0 as a result of the read access to the track 122 on the rotating disk surface 120-1.

Manufacturing the invention's head stack assembly 50 includes coupling said at least one of the invention's head gimbal assembly 60 to the head stack 50 to at least partly create said head stack assembly. The manufacturing process may further include coupling more than one head gimbal assemblies to the head stack. The manufacturing may further, preferably include coupling the main flex circuit 200 to the flexure finger 20, which further includes electrically coupled the preamplifier 24 to the read trace path rtp to provide the read signal 25-R as a result of the read access of the data 122 on the rotating disk surface 120-1. The invention includes the manufacturing process for the head stack assembly and the head stack assembly as a product of the manufacturing process. The step coupling the head gimbal assembly 60 to the head stack 50 may further, preferably include swaging the base plate 72 to the actuator arm 52.

The invention includes a hard disk drive 10, shown in FIGS. 2A, 4A, 5, 6, and 7, to include the head stack assembly 50 electrically coupled to an embedded circuit 500 to process the read signal 25-R during the read access to the data 122, preferably organized as the track 122, on the rotating disk surface 120-1. The hard disk drive operates as follows when read accessing the data on the rotating disk surface. The slider 90 reports the amplified read signal ar0 as the result of the read access. The flexure finger provides the read trace path rtp for the amplified read signal, as shown in FIG. 1A. The main flex circuit 200 receives the amplified read signal from the read trace path to create the read signal 25-R. The embedded circuit receives the read signal to read the data on the rotating disk surface.

As stated before, the slider 90 reporting the amplified read signal may further include the read head 94-R driving the read differential signal pair r0 in reading the data 122 on the rotating disk surface 120-1 and the amplifier 96 receiving the read differential signal pair to generate the amplified read signal ar0.

In more detail, the hard disk drive 10 may include the servo controller 600, and possibly the embedded circuit 500, coupled to the voice coil motor 18, to provide the micro-actuator stimulus signal 650 driving the micro-actuator assembly 80, and the read signal 25-R based upon the amplified read signal ar0 contained in the read-write signal bundle rw from the read-write head 94 to generate the Position Error Signal 260.

The embedded circuit 500 may preferably include the servo controller 600, as shown in FIG. 5, including a servo computer 610 accessibly coupled 612 to a memory 620. A program system 1000 may direct the servo computer in implementing the method operating the hard disk drive 10. The program system preferably includes at least one program step residing in the memory. The embedded circuit may preferably be implemented with a printed circuit technology. The lateral control signal 82 may preferably be generated by a micro-actuator driver 28. The lateral control signal preferably includes the first lateral control signal 82P1 and the second lateral control signal 82P2, as well as the AC lateral control signal 82AC.

The voice coil driver 30 preferably stimulates the voice coil motor 18 through the voice coil 32 to provide coarse position of the slider 90, in particular, the read head 94-R near the track 122 on the rotating disk surface 120-1.

A computer as used herein may include at least one instruction processor and at least one data processor, where each of the data processors is directed by at least one of the instruction processors.

Manufacturing the hard disk drive 10 includes electrically coupling the invention's head stack assembly 50 to the embedded circuit 500 to provide the read signal 25-R as the result of the read access of the data 122 on the rotating disk surface 120-1. The invention includes this manufacturing process and the hard disk drive as a product of that process.

Making the hard disk drive 10 may further include coupling the servo controller 600 and/or the embedded circuit 500 to the voice coil motor 18 and providing the micro-actuator stimulus signal 650 to drive the micro-actuator assembly 80.

Making the servo controller 600 and/or the embedded circuit 500 may include programming the memory 620 with the program system 1000 to create the servo controller and/or the embedded circuit, preferably programming a non-volatile memory component of the memory.

Making the embedded circuit 500, and in some embodiments, the servo controller 600, may include installing the servo computer 610 and the memory 620 into the servo controller and programming the memory with the program system 1000 to create the servo controller and/or the embedded circuit.

Looking at some of the details of FIG. 6, the hard disk drive 10 includes a disk 12 and a second disk 12-2. The disk includes the rotating disk surface 120-1 and a second rotating disk surface 120-2. The second disk includes a third rotating disk surface 120-3 and a fourth rotating disk surface 120-4.

The voice coil motor 18 includes an head stack assembly 50 pivoting through an actuator pivot 58 mounted on the disk base 14, in response to the voice coil 32 mounted on the head stack 54 interacting with the fixed magnet 34 mounted on the disk base. The actuator assembly includes the head stack with at least one actuator arm 52 coupling to a slider 90 containing the read-write head 94. The slider is coupled to the micro-actuator assembly 80.

The read-write head 94 interfaces through a preamplifier 24 on a main flex circuit 200 using a read-write signal bundle rw typically provided by the flexure finger 20, to a channel interface 26 often located within the servo controller 600. The channel interface often provides the Position Error Signal 260 (PES) within the servo controller. It may be preferred that the micro-actuator stimulus signal 650 be shared when the hard disk drive includes more than one micro-actuator assembly. It may be further preferred that the lateral control signal 82 be shared. Typically, each read-write head interfaces with the preamplifier using separate read and write signals, typically provided by a separate flexure finger. For example, the second read-write head 94-2 interfaces with the preamplifier via a second flexure finger 20-2, the third read-write head 94-3 via the a third flexure finger 20-3, and the fourth read-write head 94-4 via a fourth flexure finger 20-4.

During normal disk access operations, the embedded circuit 500 and/or the servo controller 600 direct the spindle motor 270 to rotate the spindle shaft 40. This rotating is very stable, providing a nearly constant rotational rate through the spindle shaft to at least one disk 12 and sometimes more than one disk. The rotation of the disk creates the rotating disk surface 120-1, used to access the track 122 while accessing the track. These accesses normally provide for reading the track and/or writing the track.

The preceding embodiments provide examples of the invention and are not meant to constrain the scope of the following claims.

What is claimed is:

1. A head gimbal assembly, comprising:
    a slider including
        a read-write head providing a read-differential signal pair, and
        an amplifier receiving said read-differential signal pair to generate an amplified read signal in said slider;
    a micro-actuator assembly mechanically coupled with said slider to aid in positioning said slider on said rotating disk surface; and
    a first power path and a second power path, both electrically coupled to said slider and to said micro-actuator assembly;
    wherein said first power path and said second power path are collectively used to provide electrical power for said amplifier in said slider to generate said amplified read signal, and used to provide said electrical power for said micro-actuator assembly.

2. The head gimbal assembly of claim 1, wherein said read-write head, comprises:
    a read head driving said read differential signal pair; and
    a write head receiving said write differential signal pair;
    wherein said slider receives said write differential signal pair to write access said data on said rotating disk surface.

3. The head gimbal assembly of claim 2, wherein said read head uses a spin valve to drive said read differential signal pair.

4. The head gimbal assembly of claim 2, wherein said read head uses a tunnel valve to drive said read differential signal pair.

5. The head gimbal assembly of claim 1, wherein said amplified read signal implements in said slider a member of the group consisting of: a second read differential signal pair; and a single-ended read signal.

6. The head gimbal assembly of claim 1, further comprising: an air-bearing surface opposite said amplifier.

7. The head gimbal assembly of claim 1,
    wherein said micro-actuator assembly aids in laterally positioning said slider to said rotating disk surface.

8. The head gimbal assembly of claim 7,
    wherein said micro-actuator assembly aids in vertically positioning said slider to said rotating disk surface.

9. The head gimbal assembly of claim 1, wherein said micro-actuator assembly employs at least one member of the group consisting of a piezoelectric effect and an electrostatic effect, to position said slider to access said data on said rotating disk surface.

10. The head gimbal assembly of claim 1, wherein said slider further comprises a vertical microactuator for adjusting the vertical distance between said read-write head and said rotating disk surface.

11. A head stack assembly, comprising at least one head gimbal assembly coupled to a head stack, with each of said head gimbal assemblies comprising
    a slider including
        a read-write head providing a read-differential signal pair, and
        an amplifier receiving said read-differential signal pair to generate an amplified read signal in said slider;
    a micro-actuator assembly mechanically coupled with said slider to aid in positioning said slider on said rotating disk surface; and
    a first power path and a second power path, both electrically coupled to said slider and to said micro-actuator assembly;
    wherein said first power path and said second power path are collectively used to provide electrical power for said amplifier in said slider to generate said amplified read signal, and used to provide said electrical power for said micro-actuator assembly.

12. The head stack assembly of claim 11, wherein said head gimbal assembly further comprises a flexure finger coupled with said slider and containing a read trace path electrically coupled to said amplified read signal;
    wherein said head stack assembly further comprises:
    a main flex circuit coupled with said flexure finger, further comprising:
    a preamplifier electrically coupled via said read trace path to said amplified read signal from said slider to create a read signal.

13. The hard disk drive, comprising
    a head stack assembly comprising at least one head gimbal assembly coupled to a head stack, with each of said head gimbal assemblies comprising
    a slider including
        a read-write head providing a read-differential signal pair, and
        an amplifier receiving said read-differential signal pair to generate an amplified read signal in said slider to at least partly create a read signal;
    a micro-actuator assembly mechanically coupled with said slider to aid in positioning said slider on said rotating disk surface; and
    a first power path and a second power path, both electrically coupled to said slider and to said micro-actuator assembly;

wherein said first power path and said second power path are collectively used to provide electrical power for said amplifier in said slider to generate said amplified read signal, and used to provide said electrical power for said micro-actuator assembly; and wherein said hard disk drive further comprises said head stack assembly electrically coupled to an embedded circuit to process said read signal during said read access to said data on said rotating disk surface.

14. A method of operating a hard disk drive, comprising the step:
  read accessing data on a rotating disk surface to create a read access, comprising the steps:
  a slider reporting an amplified read signal in said slider as a result of said read access to said data on said rotating disk surface, further comprising the steps
  a read-write head in said slider providing a read-differential signal pair; and
  an amplifier in said slider receiving said read-differential signal pair to generate said amplified read signal in said slider;
  a flexure finger providing a read trace path for said amplified read signal;
  said main flex circuit receiving said amplified read signal from said read trace path to create said read signal; and
  an embedded circuit receiving said read signal to read said data on said rotating disk surface.

15. A method of manufacturing a hard disk drive, comprising the steps:
  mounting a head stack assembly on a disk base to access at least one rotating disk surface, with said head stack assembly comprising at least one head gimbal assembly coupled to a head stack, with each of said head gimbal assemblies comprising
  a slider including
    a read-write head providing a read-differential signal pair, and
    an amplifier receiving said read-differential signal pair to generate an amplified read signal in said slider to at least partly create a read signal;
  a micro-actuator assembly mechanically coupled with said slider to aid in positioning said slider on said rotating disk surface; and
  a first power path and a second power path, both electrically coupled to said slider and to said micro-actuator assembly;
  wherein said first power path and said second power path are collectively used to provide electrical power for said amplifier in said slider to generate said amplified read signal, and used to provide said electrical power for said micro-actuator assembly; and
  electrically coupling said head stack assembly to an embedded circuit to provide said read signal as said result of said read access to said data on said rotating disk surface to create said hard disk drive.

16. The hard disk drive as a product of the process of claim 15.

17. A method of manufacturing a head stack assembly, comprising the step:
  coupling said at least one head gimbal assembly to a head stack to at least partly create said head stack assembly, each of said head gimbal assemblies includes
  a slider including
    a read-write head providing a read-differential signal pair, and
    an amplifier receiving said read-differential signal pair to generate an amplified read signal in said slider;
  a micro-actuator assembly mechanically coupled with said slider to aid in positioning said slider on said rotating disk surface; and
  a first power path and a second power path, both electrically coupled to said slider to provide power to said amplifier and to said micro-actuator assembly.

18. The head stack assembly as a product of the process of claim 17.

19. A method of manufacturing a head gimbal assembly, comprising the step:
  coupling a micro-actuator assembly to a slider including an amplifier in said slider to at least partly create said head gimbal assembly; and
  electrically coupling both a first power path and a second power path to said amplifier in said slider and to said micro-actuator assembly.

20. The head gimbal assembly as a product of the process of claim 19.

* * * * *